(12) United States Patent
Zhong et al.

(10) Patent No.: US 10,701,015 B2
(45) Date of Patent: *Jun. 30, 2020

(54) LINK WITH PERMISSION PROTECTED DATA PREVIEW

(71) Applicant: Microsoft Technology Licensing, LLC, Redmond, WA (US)

(72) Inventors: Lin Zhong, Redmond, WA (US); Amy Huyen Phuoc Nguyen, Bellevue, WA (US); Betsy McIntyre, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/844,315

(22) Filed: Dec. 15, 2017

(65) Prior Publication Data

US 2019/0190868 A1   Jun. 20, 2019

(51) Int. Cl.
*H04L 12/58* (2006.01)
*G06F 16/957* (2019.01)
*G06F 16/955* (2019.01)
*G06F 21/00* (2013.01)

(52) U.S. Cl.
CPC ............ *H04L 51/22* (2013.01); *G06F 16/957* (2019.01); *G06F 16/9566* (2019.01); *G06F 21/00* (2013.01); *H04L 51/08* (2013.01); *H04L 51/18* (2013.01); *H04L 51/12* (2013.01)

(58) Field of Classification Search
CPC .... G06F 17/21; G06F 17/2235; G06F 16/972; G06Q 10/107; G06Q 10/101
See application file for complete search history.

(56) References Cited

U.S. PATENT DOCUMENTS

| | | | |
|---|---|---|---|
| 7,369,260 B2 | 5/2008 | Buschi et al. | |
| 7,549,129 B2* | 6/2009 | Sheldon | G06F 1/3231 715/835 |
| 8,700,719 B1 | 4/2014 | Covitz et al. | |
| 8,935,768 B1* | 1/2015 | Tyree | G06F 21/6227 706/12 |
| 9,923,851 B1* | 3/2018 | Sprauve | H04L 51/08 |

(Continued)

OTHER PUBLICATIONS

"OneDrive Dev Center", Retrieved From: <<https://dev.onedrive.com/items/thumbnail.htm>>, Retrieved on: Nov. 20, 2017, 3 Pages.

(Continued)

*Primary Examiner* — Todd L Barker

(57) ABSTRACT

Aspects of the present disclosure relate to systems and methods for providing a preview of protected content in a user interface to an email client. An email client may receive an email message including a uniform resource locator (URL) linked to at least one item stored in a data service. The email client may send the URL to an email server to determine whether a recipient of the URL has permissions to the at least one item stored in the data service. When it is determined that the recipient of the URL has permissions to the at least one item stored in the data service, content for a permission protected preview of the at least one item may be received at the email client. The email client may render the permission protected preview of the at least one item in a user interface to the email client.

20 Claims, 9 Drawing Sheets

(56) References Cited

U.S. PATENT DOCUMENTS

| | | | |
|---|---|---|---|
| 10,129,197 | B2* | 11/2018 | Liberty .................. H04L 51/22 |
| 2004/0068545 | A1 | 4/2004 | Daniell et al. |
| 2004/0243926 | A1 | 12/2004 | Trenbeath et al. |
| 2005/0251748 | A1 | 11/2005 | Gusmorino et al. |
| 2008/0024465 | A1* | 1/2008 | Hawkins ............... G06F 1/1616 345/184 |
| 2009/0254529 | A1 | 10/2009 | Goldentouch |
| 2010/0057864 | A1 | 3/2010 | Laird-mcconnell |
| 2012/0084644 | A1 | 4/2012 | Robert et al. |
| 2012/0254321 | A1 | 10/2012 | Lindsay et al. |
| 2012/0278402 | A1 | 11/2012 | Limont et al. |
| 2012/0278404 | A1 | 11/2012 | Meisels et al. |
| 2012/0284344 | A1 | 11/2012 | Costenaro et al. |
| 2012/0284639 | A1 | 11/2012 | Yuniardi et al. |
| 2013/0031208 | A1 | 1/2013 | Linton et al. |
| 2013/0067594 | A1* | 3/2013 | Kantor ................ G06F 21/6218 726/28 |
| 2013/0117376 | A1 | 5/2013 | Filman et al. |
| 2013/0238725 | A1* | 9/2013 | Trinh .................... G06F 16/972 709/206 |
| 2013/0275398 | A1* | 10/2013 | Dorman ................ G06F 16/168 707/693 |
| 2013/0318448 | A1 | 11/2013 | O'shaugnessy et al. |
| 2014/0344658 | A1* | 11/2014 | Srinivasan .......... G06F 17/2235 715/205 |
| 2014/0351697 | A1* | 11/2014 | Robert .................... G06F 9/445 715/273 |
| 2015/0143211 | A1* | 5/2015 | Kaufthal ............. G06F 17/2235 715/205 |
| 2015/0149930 | A1* | 5/2015 | Walkin .................. H04L 65/403 715/753 |
| 2015/0154156 | A1* | 6/2015 | Meyers, Jr. ......... G06F 17/2235 715/205 |
| 2016/0065555 | A1* | 3/2016 | Branden ............. H04L 63/0807 726/7 |
| 2018/0191652 | A1* | 7/2018 | Goel ........................ H04L 51/08 |
| 2019/0019154 | A1* | 1/2019 | Girdhar ................ G06Q 10/107 |

OTHER PUBLICATIONS

"Overview of crawled and managed properties in SharePoint Server 2013", Retrieved From: <<https://technet.microsoft.com/en-us/library/jj219630.aspx>>, Retrieved on: Nov. 20, 2017, 17 Pages.

Ryan, Gregg, "Get a DriveItem Resource", Retrieved From: <<https://dev.onedrive.com/items/get.htm>>, Sep. 10, 2017, 6 Pages.

Caputo, et al., "Using the SharePoint search Query APIs", Retrieved From: <<https://docs.microsoft.com/en-us/sharepoint/dev/general-development/using-the-sharepoint-search-query-apis>>, Sep. 25, 2017, 10 Pages.

"Email-a-File", Retrieved From: https://help.yammer.com/entries/21238143-Email-a-File, Retrieved on: Sep. 5, 2013, 4 Pages.

"Preview Links before You Click", Retrieved From: http://www.komando.com/downloads/category.aspx?id=6792, Jun. 11, 2009, 3 Pages.

"Final Office Action Issued in U.S. Appl. No. 14/095,633", dated May 6, 2016, 15 Pages.

"Final Office Action Issued in U.S. Appl. No. 14/095,633", dated Nov. 23, 2016, 15 Pages.

"Final Office Action Issued in U.S. Appl. No. 14/095,633", dated Nov. 16, 2017, 17 Pages.

"Final Office Action Issued in U.S. Appl. No. 14/095,633", dated Nov. 5, 2018, 24 Pages.

"Non Final Office Action Issued in U.S. Appl. No. 14/095,633", dated Sep. 10, 2019, 23 Pages.

"Non Final Office Action Issued in U.S. Appl. No. 14/095,633", dated Feb. 19, 2020, 28 Pages.

"Non-Final Office Action Issued in U.S. Appl. No.14/095,633", dated Oct. 7, 2015, 15 Pages.

"Non-Final Office Action Issued in U.S. Appl. No. 14/095,633", dated Jul. 26, 2018, 16 Pages.

"Non-Final Office Action Issued in U.S. Appl. No. 14/095,633", dated Mar. 13, 2017, 17 Pages.

"European Search Report Issued in European Patent Application No. 14819170.3", dated Jul. 5, 2017, 11 Pages.

"Office Action Issued in European Patent Application No. 14819170.3", dated Jul. 17, 2019, 7 Pages.

"First Office Action and Search Report Issued in Chinese Patent Application No. 201480066172.7", dated Jan. 26, 2018, 14 Pages.

"Office Action Issued in Chinese Patent Application No. 201480066172.7", dated Nov. 30, 2018, 5 Pages.

"Office Action Issued in Chinese Patent Application No. 201480066172.7", dated Aug. 15, 2018, 12 Pages.

Chitu, Alex, "Preview Google Documents Inside Gmail", Retrieved From: http://googlesystem.blogspot.in/2009/10/preview-google-documents-inside-gmail.html, Oct. 15, 2009, 2 Pages.

Dixit, Chandramouli, "Flow to Preview Links in Google Chrome without Clicking on Them", Retrieved From: http://www.dcommonman.com/preview-links-in-google-chrome/392/, Jun. 17, 2013, 3 Pages.

Horowitz, Paul, "Preview a URL Directly in Mail for Mac OS X", Retrieved From: http://osxdaily.com/2012/04/17/preview-a-url-directly-in-mail-for-mac-os-x/, Apr. 17, 2012, 3 Pages.

"International Search Report & Written Opinion for PCT Application No. PCT/US2014/067513", dated Apr. 30, 2015, 12 Pages.

Ryan, "Shared Links Overview and FAQs", Retrieved From: https://support.box.com/entries/20894888-Shared-Links-Overview-and-FAQs, Jan. 20, 2012, 4 Pages.

\* cited by examiner

LINK WITH PERMISSION PROTECTED DATA PREVIEW

BACKGROUND

Cloud storage providers (e.g., data services) provide applications such as word processing applications, spreadsheet applications, electronic slide presentation applications, email applications, chat applications, voice applications, and the like, where users can co-author and collaborate with one another within the applications. In this regard, a user may navigate to the cloud storage provider and share a file, photo, and the like, using a link to the file, photo in the cloud storage provider. One way the link is shared is via an email application. When a recipient receives a link to a file, photo, etc. stored in a cloud storage provider, the recipient clicks on the link and is directed to the cloud storage provider for accessing the file, photo, etc. As such, current technology for collaborating within applications may require an increased amount of resources. In one example, the content may be protected and the recipient may be required to enter login credentials for accessing the content at the cloud storage provider. As such, current technology for accessing protected content may be time consuming and inefficient.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for providing a preview of protected content in a user interface to an email client. In one example, an email message including a uniform resource locator (URL) linked to at least one item stored in a data service is received at an email client. The URL is sent to an email server to determine whether a recipient of the URL has permissions to the at least one item stored in the data service. When it is determined that the recipient of the URL has permissions to the at least one item stored in the data service, content for generating a preview of the at least one item is received at the email client. The preview of the at least one item is rendered in a user interface to the email client.

In another aspect, a method for rendering a permission protected preview of at least one item is presented. An email client may receive an email message including a uniform resource locator (URL) linked to at least one item stored in a data service. The email client may send the URL to an email server to determine whether a recipient of the URL has permissions to the at least one item stored in the data service. When it is determined that the recipient of the URL has permissions to the at least one item stored in the data service, content for the permission protected preview of the at least one item may be received at the email client. The email client may render the permission protected preview of the at least one item in a user interface to the email client.

In yet another aspect, a method for providing a preview of a protected item is provided. A uniform resource locator (URL) linked to at least one item stored in a data service is received at an email server. The email server determines whether a recipient of the URL at an email client has permissions to the at least one item stored in the data service. When it is determined that the recipient of the URL has permissions to the at least one item stored in the data service, information associated with the at least one item stored in the data service is received. Content is created for a preview of the at least one item by processing the information associated with the at least one item stored in the data service. The content for the preview of the at least one item is sent to the email client for rendering the preview of the at least one item in a user interface to the email client.

DESCRIPTION OF THE DRAWINGS

The detailed description is made with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
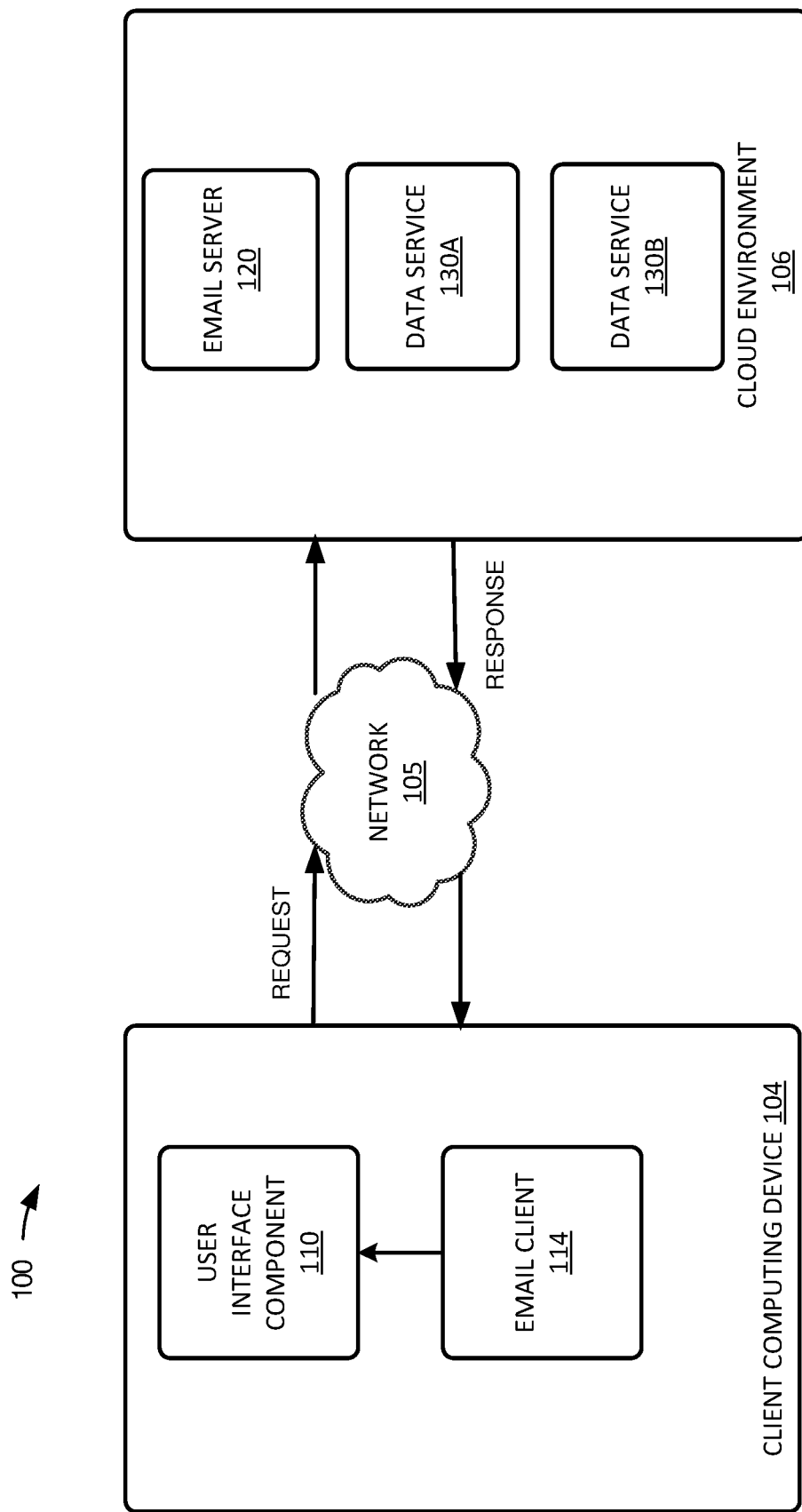
FIG. 1 illustrates an exemplary email system for providing a preview of protected content in a user interface to an email client, according to an example aspect.

Aspects of the disclosure are generally directed to providing a preview of protected content in a user interface to an email client. For example, a recipient of an email message may receive an email message including a link to content stored at a data storage provider (e.g., a data service). Conventionally, the recipient identifies the link in the email message and clicks on the link to be directed to the data service at which the content is located. In one example, the link may point to content located in a public domain such that the user isn't required to have permissions to access the content. In another example, the link may point to protected content such that the user is required to have permissions to access the content. In this example, when the link is activated, conventionally, the email client may redirect the user to the location of the protected content. The user may be required to enter login credentials to access the protected content. In this regard, the present disclosure describes techniques for providing/rendering a preview of protected content in a user interface to the email client and providing access to the protected content within the email client.

As discussed above, a user may navigate to the cloud storage provider and share a file, photo, and the like, using a link to the file, photo in the cloud storage provider. One way the link is shared is via an email application. When a recipient receives a link to a file, photo, etc. stored in a cloud storage provider, the recipient clicks on the link and is directed to the cloud storage provider for accessing the file, photo, etc. As such, current technology for collaborating within applications may require an increased amount of resources. In one example, the content may be protected and the recipient may be required to enter login credentials for accessing the content at the cloud storage provider. As such, current technology for accessing protected content may be time consuming and inefficient.

Accordingly, as described herein, an email client may receive an email message including a uniform resource locator (URL) linked to at least one item (e.g., content/data) stored in a data service. In one example, the at least one item may include at least a file, a photo, and a folder including a plurality of at least one of files and photos. When the email client identifies the URL in the email message, the email client may send the URL to an email server. The email server may determine whether the recipient of the URL has permissions to the at least one item stored in the data service. For example, the email server may send a request to the data service for recipient permissions. In another example, the email server may determine whether the URL is a link to one or more data services. For example, before the email server sends a request to the data service for recipient permissions, the email server determines which data service the URL points to. As such, the email server knows which data service to send the request for recipient permissions.

In one example, the request for recipient permissions may include a request for the item stored at the data service and/or information associated with the item stored at the data service. As such, when it is determined that the recipient of the URL has permissions to the at least one item stored in the data service, the email server may receive information associated with the at least one item stored in the data service and/or the at least one item itself. The email server processes the information to create content for a preview of the at least one item. The email server sends the content for the preview of the at least one item to the email client for rendering the preview of the at least one item in a user interface to the email client. The email client receives the content for generating a preview of the at least one item. In turn, the email client generates and renders the preview of the at least one item in the user interface to the email client. Accordingly, a technical effect that may be appreciated is that email technology is improved via the techniques disclosed herein by providing a preview of data/content/items in the email client that would otherwise be protected behind a security wall.

In one example, the preview of the at least one item is rendered in a reading pane of the email client. The email client may render the URL with the preview of the at least one item stored in the data service in the user interface to the email client. In some cases, in response to receiving an indication of interest with respect to the URL, the email client may generate a side by side view including the reading pane and an interactive item view. In one example, when the at least one item is the folder, the rendered preview is a folder preview. The folder preview may include a tile for every item inside the folder. In another example, when the at least one item is the file, the rendered preview may include at least a file title, a file thumbnail, and a file description. As such, another technical effect that may be appreciated is that by utilizing a single application (e.g., the email client) for providing a side by side view including the reading pane (e.g., with the preview of the protected content) and an interactive item view, less computing resources are utilized. For example, by only requiring the execution of a single application, at the very least, processor load may be reduced and memory may be conserved.

Furthermore, by utilizing a single application (e.g., the email client) for providing a side by side view including the reading pane (e.g., with the preview of the protected content) and an interactive item view, another technical effect that may be appreciated is that user interaction performance with the user interface is increased. For example, a user only needs to interact with the email client and/or the email reading pane to view, access, edit, and interact with data stored at a data service/cloud storage provider (e.g., the user has access to permission protected data at the email client). For example, a user is not required to open and initiate multiple instances of a browser, windows, and/or applications and/or enter credentials to access permission protected data from multiple data sources.

Referring now to the drawings, in which like numerals represent like elements through the several figures, aspects of the present disclosure and the exemplary operating environment will be described. With reference to FIG. 1, one aspect of an email system 100 for providing a preview of protected content in a user interface to an email client is illustrated. The email system 100 may include a client computing device 104 and a cloud environment 106. In aspects, the email system 100 may be implemented on the client computing device 104. In a basic configuration, the client computing device 104 is a handheld computer having both input elements and output elements. The client computing device 104 may be any suitable computing device for implementing the email system 100 for providing a preview of protected content in a user interface to an email client. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device 104 for implementing the email system 100 for providing a preview of protected content in a user interface to an email client may be utilized.

In aspects, the email system 100 may be implemented in the cloud environment 106. The cloud environment 106 may provide data to and from the client computing device 104 through a network 105. In one example, the cloud environment 106 may include productivity software services such as Office 365®. In aspects, the email system 100 may be implemented in more than one cloud environment 106, such as a plurality of cloud environments 106. As discussed above, the cloud environment 106 may provide data to and from the client computing device 104 through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. In another aspect, the email system 100 may be implemented as a web-based application. In one example, the web-based application may include any client-server software application where the client (e.g., user interface) runs in a web-browser and/or any component capable of rendering HTML, Flash, Silverlight, and the like.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera functionality for capturing and interpreting user gestures for controlling the functionality of the computing device, and the like.

The various components may be implemented using hardware, software, or a combination of hardware and software. In aspects, the client computing device 104 may include a user interface component 110 and an email client 114. The user interface component 110 may facilitate interaction with the email client 114 and/or access to data. For example, the user interface component 110 may display and/or render a navigation pane, a reading pane, an email inbox, a header, an interactive item view, and a variety of data, for example as discussed herein, in the email client 114. The email client 114 may include any email application configured to read, access, and manage email messages such as Outlook®, Outlook Web App®, Mobile Outlook®, Outlook.com, Mozilla®, Thunderbird®, Mail, and the like.

In one example, the email client 114 may receive email messages from the email server 120. In one example, the email server 120 may include any email server capable of sending and receiving email messages such as an Exchange Server. The email client 114 may receive email messages via simple mail transfer protocol (SMTP) from the email server 120. The email messages may include a uniform resource locator (URL). The URL may be turned into a clickable link and indicate a location/source of an item. In this regard, the URL may be linked to at least one item. In one example, the at least one item is stored in a cloud storage provider such as one of a first data service 130A and a second data service 130B. The at least one item may include data such as files, photos, music, email attachments, documents, web pages, and the like. In another example, the at least one item may include a folder including a plurality of items. For example, a folder may include a plurality of files and/or documents. In another example, a folder may include a photo album including a plurality of photos/pictures. A file may include a word document, a spreadsheet, an electronic slide presentation, an email, a chat conversation, and the like.

In one example, when the email client identifies a URL in an email message, the email client 114 may send the URL to the email server 120 hosted by the cloud environment 106. As illustrated in FIG. 1, the cloud environment 106 may include the email server 120, the first data service 130A and the second data service 130B. The first data service 130A and the second data service 130B may be configured to store, manage, and access data and/or information associated with the email system 100. For example, the first data service 130A and the second data service 130B may store one or more of the items discussed herein such as files, photos, music, email attachments, documents, web pages, and the like. In one example, the first data service 130A and the second data service 130B may include data services/cloud storage providers such as OneDrive® for Business, Sharepoint®, OneDrive® Consumer, and the like.

When the email server 120 receives the URL from the email client 114, the email server 120 may determine whether the URL is a link to one or more of the first data service 130A and the second data service 130B. As described herein, the URL may indicate the location/source of one or more items. In this regard, the URL may provide a link for accessing the one or more items at the indicated location/source. When the email server 120 determines that the URL is a link to one or more of the first data service 130A and the second data service 130B, the email server 120 may determine whether the recipient of the URL (e.g., the recipient of the email message received by the email client 114) has permissions to the item (or items) identified by the URL and stored in the data service (e.g., 130A/130B) identified by the URL/link. In one example, the permissions may include recipient editing permissions, recipient view permissions, anyone in the sender's organization edit permissions, anyone in the sender's organization view permissions, anyone can edit permissions, and anyone can view permissions. In one example, the email server 120 may send a request to the first data service 130A and/or the second data service 130B for recipient permissions (e.g., the data service identified by the URL/link). In another example, the email server 120 may send a request to the first data service 130A and/or the second data service 130B for information associated with the one or more items stored at the data service (e.g., the data service identified by the URL/link). In another example, the email server 120 may send a request to the first data service 130A and/or the second data service 130B for recipient permissions and information associated with the one or more items stored at the data service (e.g., the data service identified by the URL/link). In another example, the email server 120 may send a request to the first data service 130A and/or the second data service 130B for the one or more items stored at the data service (e.g., the data service identified by the URL/link).

In one example, the request for recipient permissions and/or information associated with the one or more items stored at the data service (e.g., the data service identified by the URL/link) may be sent through a different application programming interface (API) for each data service (e.g., data service 130A, data service 130B). For example, the email server 120 may call and/or execute an API associated with the first data service 130A to request recipient permissions and/or information associated with the one or more items from the first data service 130A. In another example, the email server may call and/or execute an API associated with the second data service 130B to request recipient permissions and/or information associated with the one or more items from the second data service 130B.

When it is determined that the recipient of the URL has permissions to the one or more items stored in the data service (e.g., data service 130A, data service 130B), the email server 120 may receive information associated with the one or more items stored at the data service (e.g., the data service identified by the URL/link) and/or the one or more items itself. The email server 120 processes the information to create content for a preview of the one or more items. For example, the email server 120 may pull images from a file, implement a screen shot of a file, process metadata associated with the item, and the like to create the content for the preview. The email server 120 may send the content for the preview of the one or more items to the email client 114 for rendering the preview of the one or more items in a user interface to the email client 114 (e.g., via the user interface component 110).

In some examples, the email client 114 may receive the content from the email server 120 for generating a preview of the one or more items. In one example, when the one or more items include a folder, the previewed is generated as a folder preview. For example, a folder may include a plurality of items. As such, the folder preview may include a tile for every item inside the folder. As such, the folder preview includes a preview of the items inside the folder. In another example, when the one or more items include a file, the preview is generated to include at least a file title, a file thumbnail, and a file description.

In some examples, the email client 114 and/or the user interface component 110 may be configured to render the preview of the at least one item in the user interface to the email client. In one example, the preview of the one or more items is rendered in a reading pane of the email client 114, which will be described in detail relative to FIGS. 3A-4B below. In one example, the email client 114 and/or the user interface component 110 may be configured to render the URL linked to the one or more items stored in the data service (e.g., data service 130A, data service 130B) in the user interface to the email client 114. In one example, the URL is rendered in the reading pane of the email client 114 proximal the preview of the one or more items. In response to receiving, at the user interface, an indication of interest with respect to the URL, the email client 114 and/or the user interface component 110 may generate a side by side view including the reading pane and an interactive item view. The interactive item view may include a view of the protected item such that a user (e.g., the recipient of the email message) may interact with the item. The email client 114 and/or the user interface component 110 may be configured to render the side by side view in the user interface to the email client 114. As such, when it is determined that a recipient of an email message including a URL linked to an identified data service has permissions to data located at the data service, the email client 114 may render a preview of protected content in a user interface to an email client 114.

In one example, email client 114 may be part of and/or located in the cloud environment 106. In another example, the email client 114 may be part of and/or located at the first data service 130A and/or the second data service 130B. In one example, the first data service 130A and the second data service 130B may be part of and/or located at the client computing device 104. It is appreciated that although one cloud environment 106 is illustrated in FIG. 1, the email system 100 may include a plurality of cloud environments 106 with a plurality of data services (e.g., data service 130A and data service 130B) and a plurality of email servers 120. In some cases, the cloud environment 106 may include a plurality of data services (e.g., data service 130A and data service 130B) and a plurality of email servers 120. It is appreciated that although data service 130A and data service 130B are illustrated in FIG. 1, the email system 100 may include any number of data services.

In one example, the user interface component 110 may be a touchable user interface that is capable of receiving input via contact with a screen of the client computing device 104, thereby functioning as both an input device and an output device. For example, content may be displayed, or output, on the screen of the client computing device 104 and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface component 110 may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device 104, thereby functioning as both an input device and an output device. For example, content may be displayed, or output, on the screen of the client computing device 104 and input may be received by contacting the screen using a cursor, for example. In this regard, contact may include, for example, placing a cursor on the non-touchable user interface using a device such as a mouse.

Figure 2:
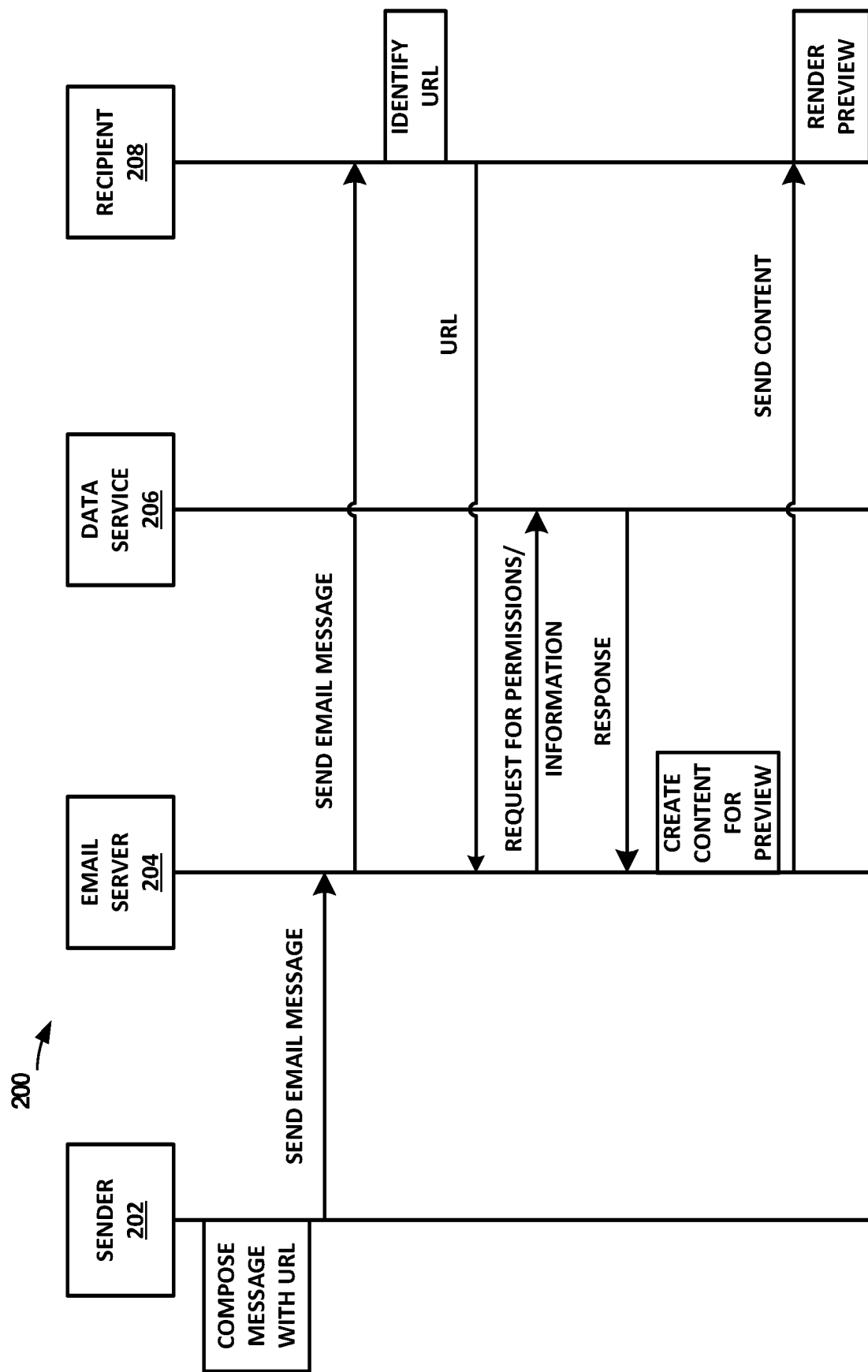
FIG. 2 illustrates a sequence diagram for rendering a preview of protected data in a user interface to an email client, according to an example aspect.

With reference now to FIG. 2, a sequence diagram 200 for rendering a preview of protected data in a user interface to an email client is illustrated. The sequence diagram 200 includes a sender 202, an email server 204, a data service 206 and a recipient 208. A sender 202 may compose an email message that includes a URL. For example, as discussed herein, the URL may be a link to at least one item stored at a data service. The email message including the URL may be sent to the email server 204 from the sender 202 (e.g., from a client computing device). The email server 204 may send the email message to the recipient 208 indicated in the email message. The recipient 208 receives the email message at an email client at a client computing device. The recipient 208 (e.g., the email client) may identify that the email message includes a URL. When the URL is identified in the email message, the recipient 208 (e.g., the email client) sends the URL to the email server 204. The email server 204 sends a request for recipient permissions and/or information associated with an item identified in the URL to the data service 206. When the data service 206 identifies that the recipient 208 has permissions to the item identified in the URL, the data service 206 sends a response including at least information associated with the item identified in the URL to the email server 204. The email server 204 creates content for a preview of the item by processing the information associated with the item. The email server 204 sends the content for the preview to the recipient 208 (e.g., the email client) to be rendered in a user interface to the email client. The recipient 208 (e.g., the email client) renders the preview of the protected content in the user interface to the email client.

Figure 3A:
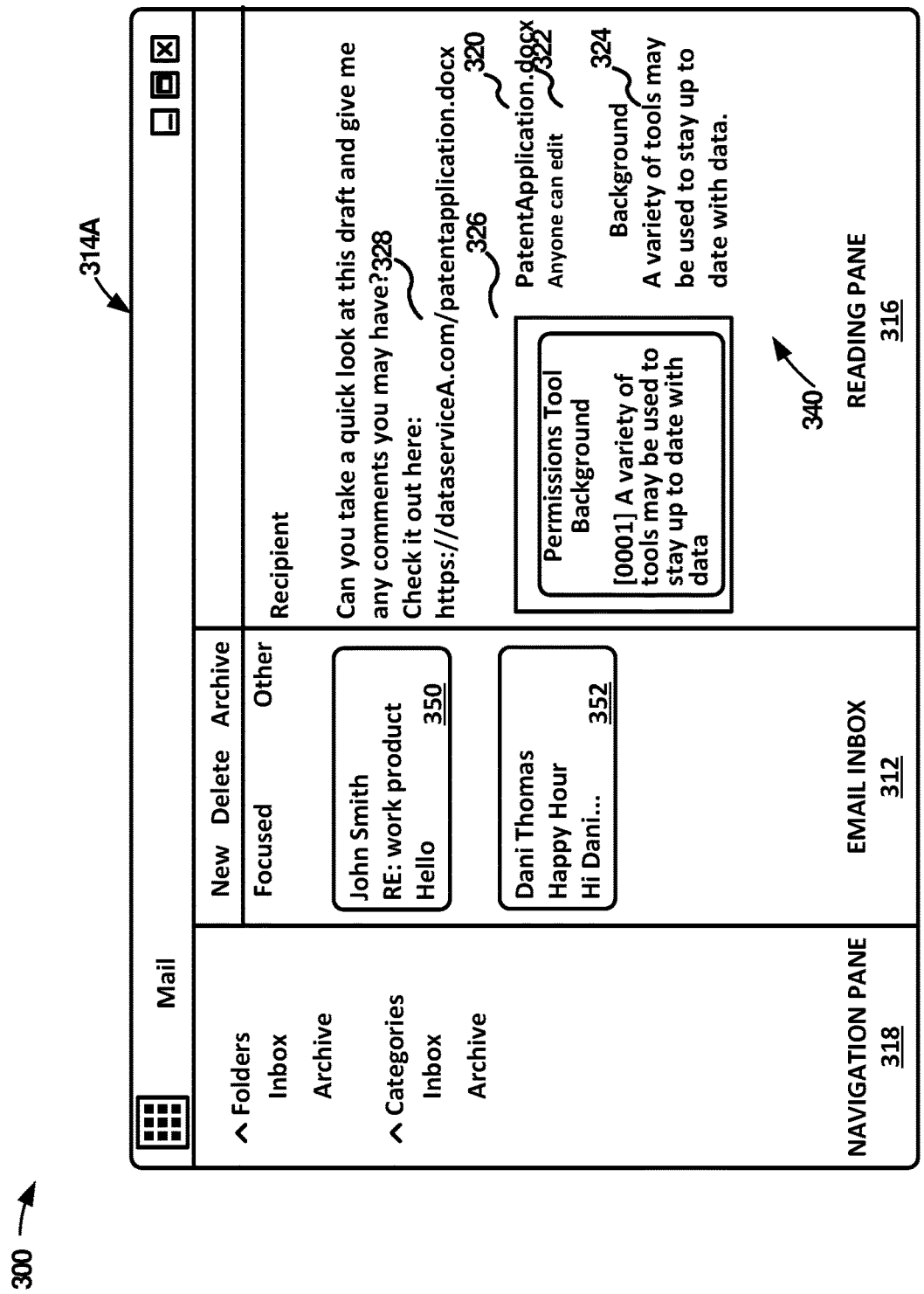
FIG. 3A illustrates one view in a progression of view of an email client, according to an example aspect.

Referring now to FIG. 3A, one view 314A in a progression of views of an email client 300 is shown. Email client 300 may be any application or collection of applications, module or collection of modules, service or services, or any variation or combination thereof capable of facilitating sharing of content, communication, collaboration, conversations, and the like. Examples of the email client 300 include Microsoft® Outlook®, Outlook® Web App, Mobile Outlook®, Hotmail®, Outlook.com, and Gmail, as well as any other email client and/or email application. The view 314A of the email client 300 is an example of a view a user may encounter when interacting with the email client 300. In one example, the view 314A may include a navigation pane 318, an email inbox 312, and a reading pane 316. The various components described herein may be implemented using hardware, software, or a combination of hardware and software. The navigation pane 318 includes contents and options for activating various modules, services, and/or applications that are part of the email client 300. For example, the navigation pane 318 may include options for activating mail, calendars, tasks, contacts, notes, folders, and the like. In one example, the navigation pane 318 may include a plurality of folders. As illustrated in FIG. 3A, the navigation pane 318 includes an inbox folder among other folders. In some cases, the inbox folder may include subfolders.

In one example, the email inbox 312 includes one or more email messages. In the example illustrated in FIG. 3A, the email inbox 312 includes email message 350 and email message 352. When an email message (e.g., email message 350) is selected, contents associated with the selected email message may be displayed in the reading pane 316. In this regard, the reading pane 316 may include contents associated with a selected message from the plurality of messages in the email inbox 312. As illustrated in FIG. 3A, the contents included in the reading pane 316 include a URL 328 linked to a patent application located at data service A. In this regard, the URL 328 indicates the location/source of the patent application. FIG. 3A further illustrates a preview 340 (e.g., a permission protected preview) of at least one item (e.g., the patent application). The preview 340 includes a file title 320, file permissions 322, a file description 324, and a file thumbnail 326. In the example illustrated in FIG. 3A, the file title 320 is Patent Application, the file permissions 322 are anyone can edit, the file description 324 includes a snapshot of the background portion of the patent application, and the file thumbnail 326 includes a preview of a portion of the first page of the patent application.

As illustrated in FIG. 3A, when the email client 300 receives an incoming email message (e.g., email message 350) including a URL 328, as described herein, the email client 300 sends the URL 328 to the email server, and when it is determined that the recipient of the email message has permissions to the item identified by the URL, the email client 300 receives content for rendering a preview 340 of the protected content.

Figure 3B:
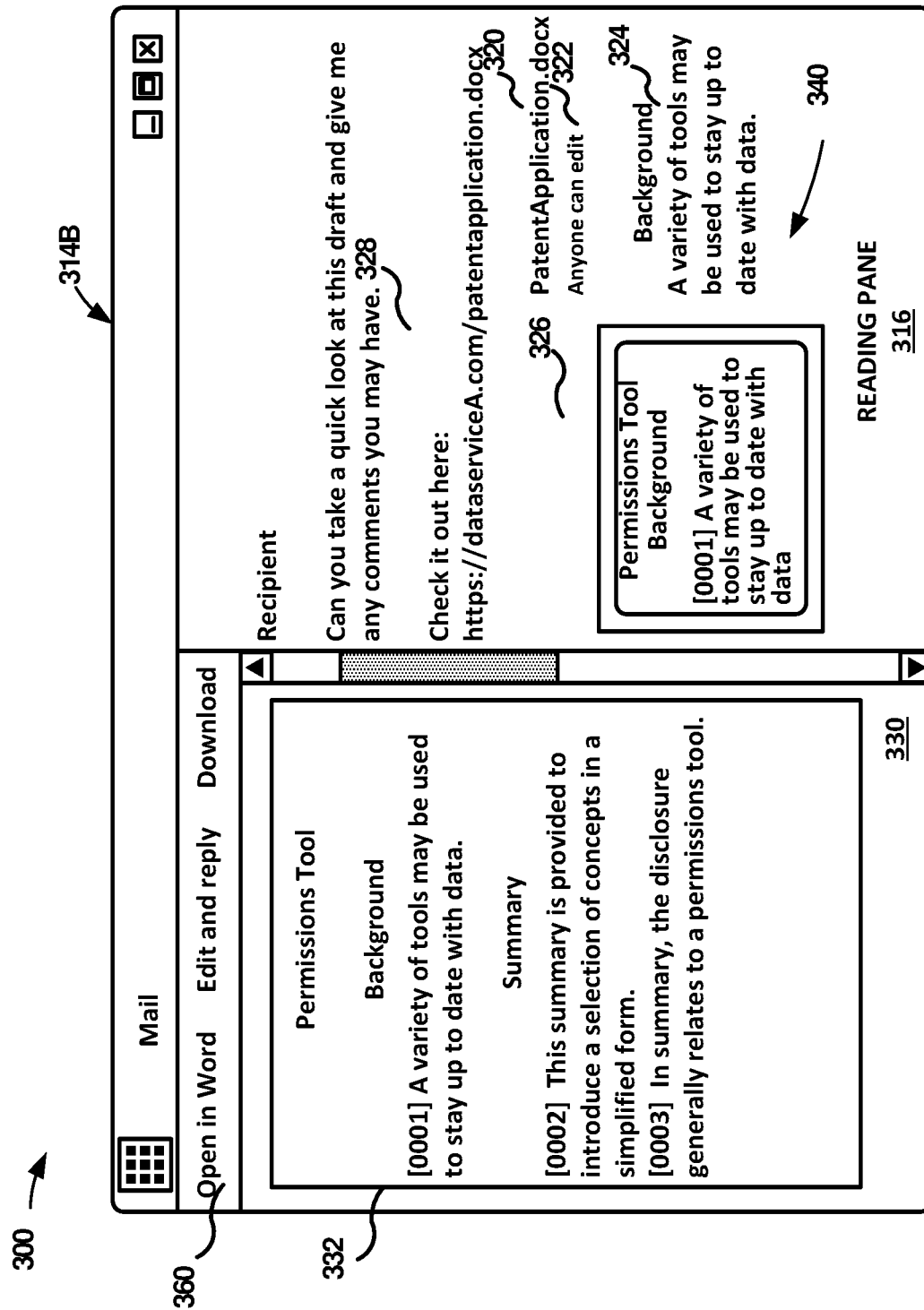
FIG. 3B illustrates another view in the progression of views of the email client of FIG. 3A, according to an example aspect.

Referring now to FIG. 3B, another view 314B in a progression of views of the email client 300 is shown. The view 314B of the email client 300 is an example of a view a user may encounter when interacting with the email client 300. In one example, the view 314B may include a reading pane 316 and an interactive item view 330. The various components described herein may be implemented using hardware, software, or a combination of hardware and software. As described herein, in response to receiving an indication of interest with the respect to the URL (e.g., URL 328 of FIG. 3A), the email client 300 may generate a side by side view including the reading pane 316 and the interactive item view 330, as illustrated in FIG. 3B.

As illustrated in FIG. 3B, the reading pane 316 in the view 314B of the email client 300 includes the same contents as the contents included in the reading pane 316 of view 314A. For example, the reading pane 316 includes the URL 328 linked to a patent application located at data service A and the preview 340 (e.g., a permission protected preview) of the patent application. The preview 340 includes the file title 320, the file permissions 322, the file description 324, and the file thumbnail 326. The interactive item view 330 in the rendered side by side view includes the patent application 332 identified in the URL 328. The recipient may interact with the patent application 332 by reading/viewing the patent application, editing the patent application 332 (e.g., as in this case, the recipient has edit permissions), make comments relative to the patent application 332, and the like. As illustrated in FIG. 3B, the interactive item view 330 includes interactive options 360 for interacting with the patent application 332. The options 360 include open in Word, edit and reply, and download. In this regard, the recipient may quickly and easily view the preview 340 of the patent application 332, determine that she wants to review the patent application 332, click on the URL 328 to quickly view and/or edit the patent application 332 within the email client 300 and respond to the email message with any comments, etc.

Figure 4A:
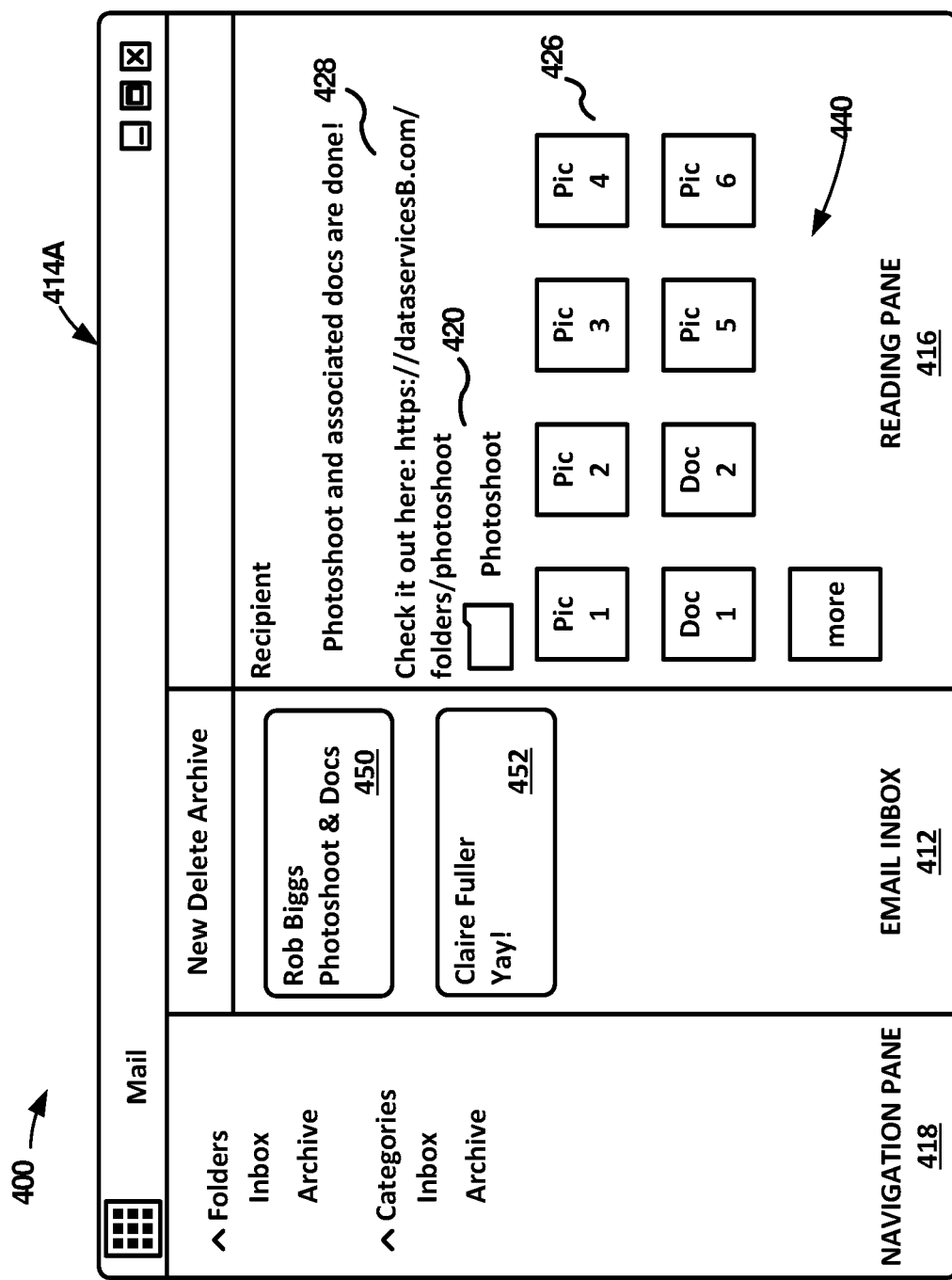
FIG. 4A illustrates one view in a progression of views of an email client, according to an example aspect.

Referring now to FIG. 4A, one view 414A in a progression of views of an email client 300 is shown. Similar to email client 300, email client 400 may be any application or collection of applications, module or collection of modules, service or services, or any variation or combination thereof capable of facilitating sharing of content, communication, collaboration, conversations, and the like. The view 414A of the email client 400 is an example of a view a user may encounter when interacting with the email client 400. In one example, the view 414 may include a navigation pane 418, an email inbox 412, and a reading pane 416. The various components described herein may be implemented using hardware, software, or a combination of hardware and software. The navigation pane 418 includes contents and options for activating various modules, services, and/or applications that are part of the email client 400. For example, the navigation pane 418 may include options for activating mail, calendars, tasks, contacts, notes, folders, and the like. In one example, the navigation pane 418 may include a plurality of folders. As illustrated in FIG. 4A, the navigation pane 418 includes an inbox folder among other folders. In some cases, the inbox folder may include subfolders.

In one example, the email inbox 412 includes one or more email messages. In the example illustrated in FIG. 4A, the email inbox 412 includes email message 450 and email message 452. When an email message (e.g., email message 450) is selected, contents associated with the selected email message may be displayed in the reading pane 416. In this regard, the reading pane 416 may include contents associated with a selected message from the plurality of messages in the email inbox 412. As illustrated in FIG. 4A, the contents included in the reading pane 416 include a URL 428 linked to a photoshoot folder 420 located at data service B. In this regard, the URL 428 indicates the location/source of the photoshoot folder 420. FIG. 4A further illustrates a folder preview 440 (e.g., a permission protected folder preview) of at least one item (e.g., the photoshoot folder 420). The folder preview 440 includes the photoshoot folder 420 and a plurality of tiles 426 for every item inside the photoshoot folder 420. In the example illustrated in FIG. 4A, the plurality of tiles 426 include Pic 1, Pic 2, Pic 3, Pic 4, Doc 1, Doc 2, Pic 5, Pic 6 and more (e.g., indicating more items may be included in the photoshoot folder 420). As such, the folder preview 440 allows the recipient to view a preview of the items inside of a folder. In this example, the items include photos and documents/files.

As illustrated in FIG. 4A, when the email client 400 receives an incoming email message (e.g., email message 450) including a URL 428, as described herein, the email client 400 sends the URL 428 to the email server, and when it is determined that the recipient of the email message has permissions to the item identified by the URL, the email client 400 receives content for rendering a folder preview 440 of the protected content.

Figure 4B:
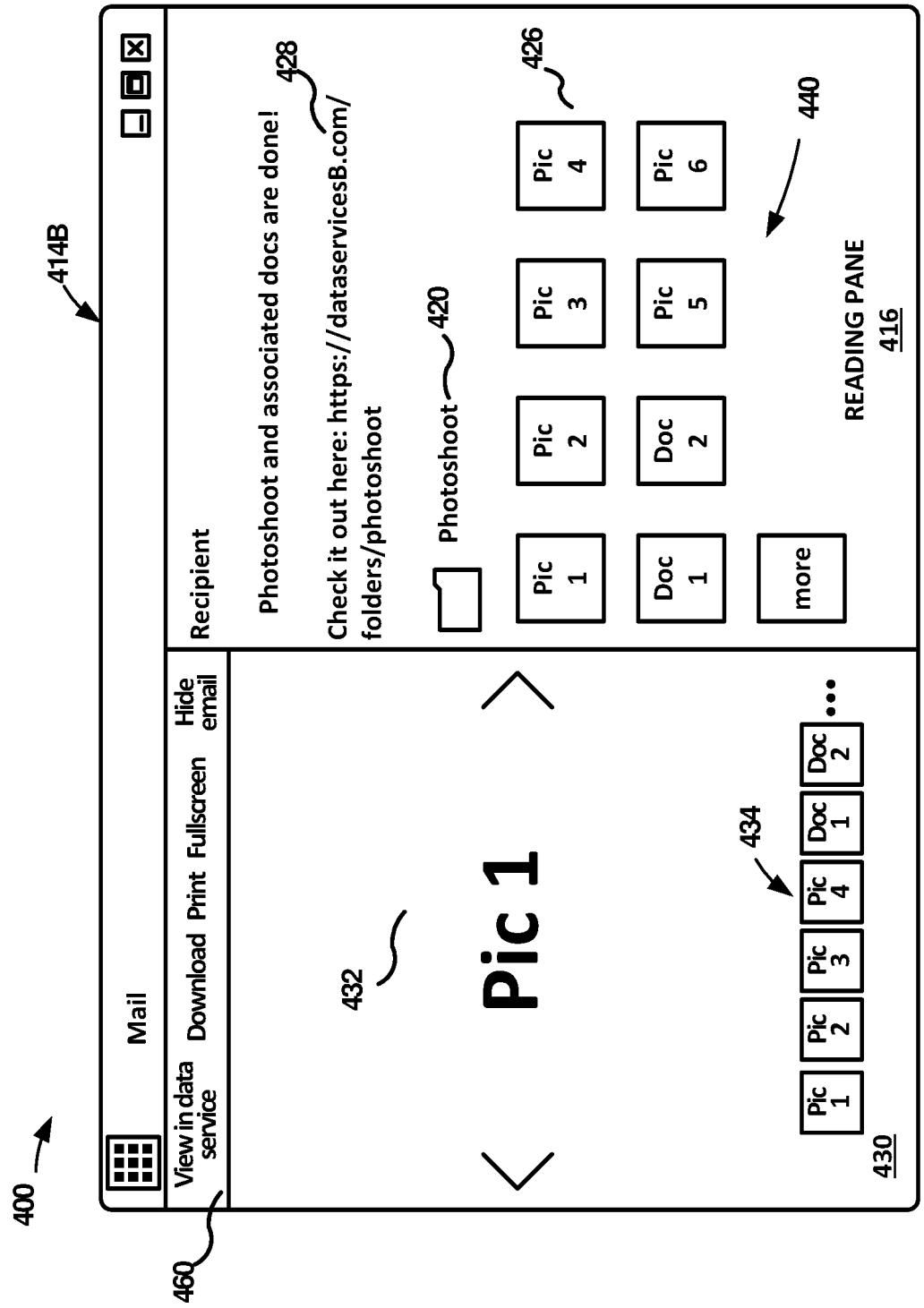
FIG. 4B illustrates another view in the progression of views of the email client of FIG. 4A, according to an example aspect.

Referring now to FIG. 4B, another view 414B in a progression of views of the email client 400 is shown. The view 414B of the email client 400 is an example of a view a user may encounter when interacting with the email client 400. In one example, the view 414B may include a reading pane 416 and an interactive item view 430. The various components described herein may be implemented using hardware, software, or a combination of hardware and software. As described herein, in response to receiving an indication of interest with the respect to the URL (e.g., URL 428 of FIG. 4A), the email client 400 may generate a side by side view including the reading pane 416 and the interactive item view 430, as illustrated in FIG. 4B.

As illustrated in FIG. 4B, the reading pane 416 in the view 414B of the email client 400 includes the same contents as the contents included in the reading pane 416 of view 414A. For example, the reading pane 416 includes the URL 428 linked to the photoshoot folder 420 located at data service B and the folder preview 440 (e.g., a permission protected folder preview) of the photoshoot folder 420. The folder preview 440 includes the photoshoot folder 420 and the plurality of tiles 426 for every item inside the photoshoot folder 420. The plurality of tiles 426 include Pic 1, Pic 2, Pic 3, Pic 4, Doc 1, Doc 2, Pic 5, Pic 6 and more (e.g., indicating more items may be included in the photoshoot folder 420). The interactive item view 430 in the rendered side by side view includes Pic 1 432 and an item preview scroll utility 434. As such, as the recipient scrolls through the items in the photoshoot folder 420 (e.g., Pic 1, Pic 2, Pic 3, Pic 4, Doc 1, Doc 2, Pic 5, Pic 6), the items are displayed in the interactive item view 430. The recipient may interact with the Pic 1 432 by viewing Pic 1 432, clicking on Pic 1 432, and using the scroll arrows to scroll through all the items in the photoshoot folder 420. As illustrated in FIG. 4B, the interactive item view 430 includes interactive options 460 for interacting with Pic 1 432. The options 460 include view in data service, download, print, full screen, and hide email In this regard, the recipient may quickly and easily view the preview 440 of Pic 1 432, determine that she wants to view Pic 1 432 in the data service, download Pic 1 432, print Pic 1 432, view Pic 1 432 using the full screen, and hide the reading pane 416 to facilitate a better view of Pic 1 432.

Figure 5:
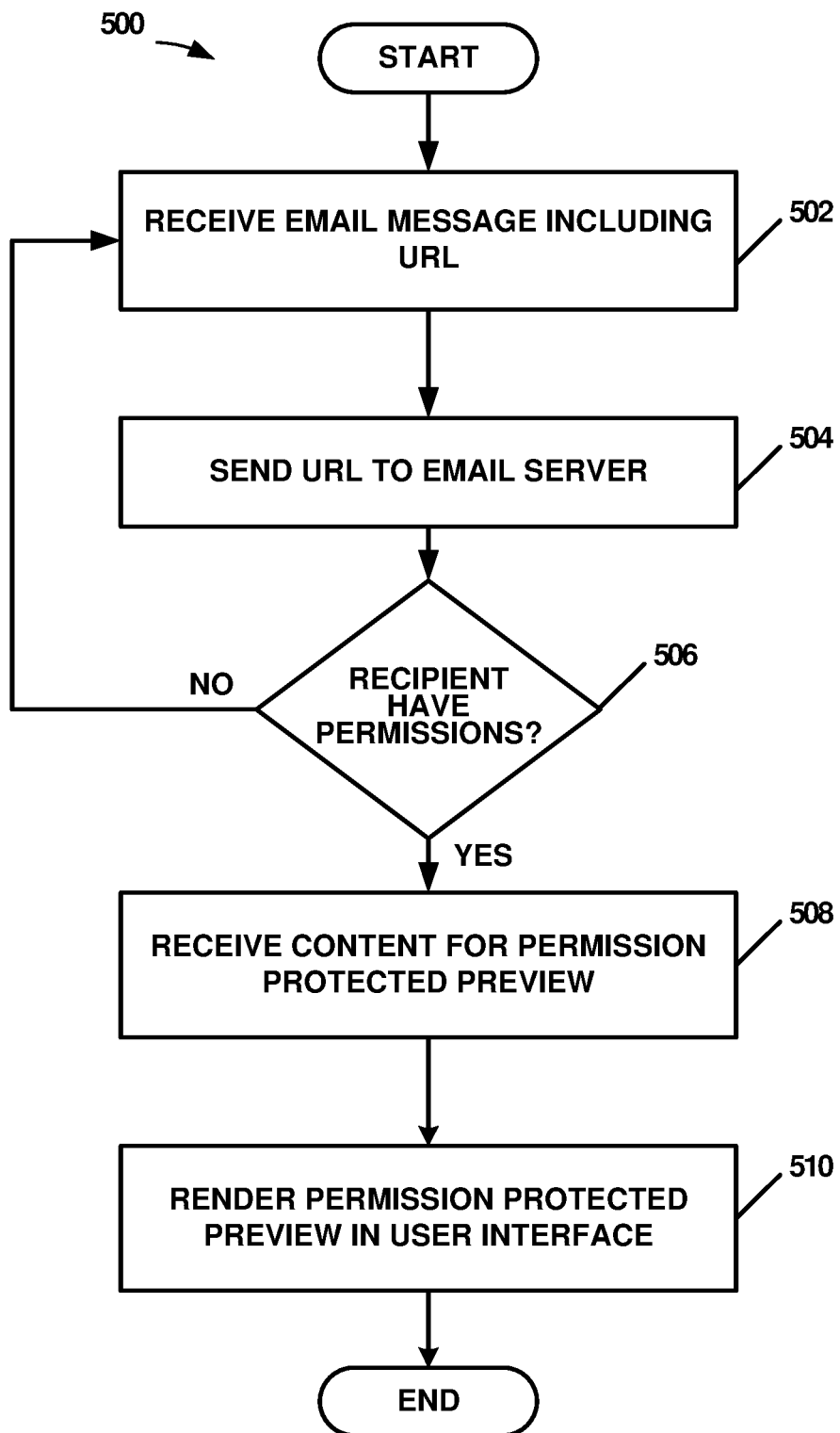
FIG. 5 illustrates an exemplary method for rendering a permission protected preview of at least one item, according to an example aspect.

Referring now to FIG. 5, an exemplary method 500 for rendering a permission protected preview of at least one item, according to an example aspect is shown. Method 500 may be implemented on a computing device or a similar electronic device capable of executing instructions through at least one processor. Method 500 may begin at operation 502, where an email message including a uniform resource locator (URL) linked to at least one item stored in a data service is received at an email client. The email client may include any email application configured to read, access, and manage email messages such as Outlook®, Outlook Web App®, Mobile Outlook®, Outlook.com, Mozilla®, Thunderbird®, Mail, and the like. The URL may be turned into a clickable link and indicate a location/source of an item. The at least one item may include data such as files, photos, music, email attachments, documents, web pages, and the like. In another example, the at least one item may include a folder including a plurality of items. For example, a folder may include a plurality of files and/or documents. In another example, a folder may include a photo album including a plurality of photos/pictures. A file may include a word document, a spreadsheet, an electronic slide presentation, an email, a chat conversation, and the like.

When the URL is identified in the email message, flow proceeds to operation 504 where the URL is sent to an email server to determine whether a recipient of the URL has permissions to the at least one item stored in the data service. In one example, the email server may include any email server capable of sending and receiving email messages such as an Exchange Server. The email client may send and receive email messages via simple mail transfer protocol (SMTP) to/from the email server. The data service may store one or more of the items discussed herein such as files, photos, music, email attachments, documents, web pages, and the like. In one example, the data service may include data services/cloud storage providers such as OneDrive® for Business, Sharepoint®, OneDrive® Consumer, and the like.

At decision operation 506, it is determined whether a recipient of the URL has permissions to the at least one item stored in the data service. For example, the email server may send a request to the data service for recipient permissions (e.g., the data service at which the item identified in the URL is located). When it is determined that the recipient of the URL does not have permissions to the at least one item stored in the data service, flow proceeds back to operation 502 where another email message including a URL may be received at the email client. As such, when the recipient does not have permissions to the at least one item stored in the data service, the permission protected preview may not be rendered to the recipient in the user interface to the email client. For example, the recipient may not receive the email message at all or may receive the email message without the URL and the permission protected preview of the item identified by the URL.

When it is determined that the recipient of the URL does have permissions to the at least one item stored in the data service, flow proceeds to operation 508 where content for the permission protected preview of the at least one item is received at the email client. As such, the client may generate the permission protected preview of the at least one item using the received content. In one example, when the at least one item includes a folder, the previewed is generated as a folder preview. For example, a folder may include a plurality of items. As such, the folder preview may include a tile for every item inside the folder. As such, the folder preview includes a preview of the items inside the folder. In another example, when the at least one item includes a file, the preview is generated to include at least a file title, a file thumbnail, and a file description.

When the email client generates the permission protected preview of the at least on item using the received content, flow proceeds to operation 510 where the permission protected preview of the at least one item is rendered in a user interface to the email client. In one example, the permissions may include recipient editing permissions, recipient view permissions, anyone in the sender's organization edit permissions, anyone in the sender's organization view permissions, anyone can edit permissions, and anyone can view permissions. In one example, the preview of the at least one item is rendered in a reading pane of the email client. In one example, the URL linked to the at least one item stored in the data service is rendered in the reading pane in the user interface to the email client. In one example, the URL is rendered in the reading pane of the email client proximal the preview of the at least one item.

Figure 6:
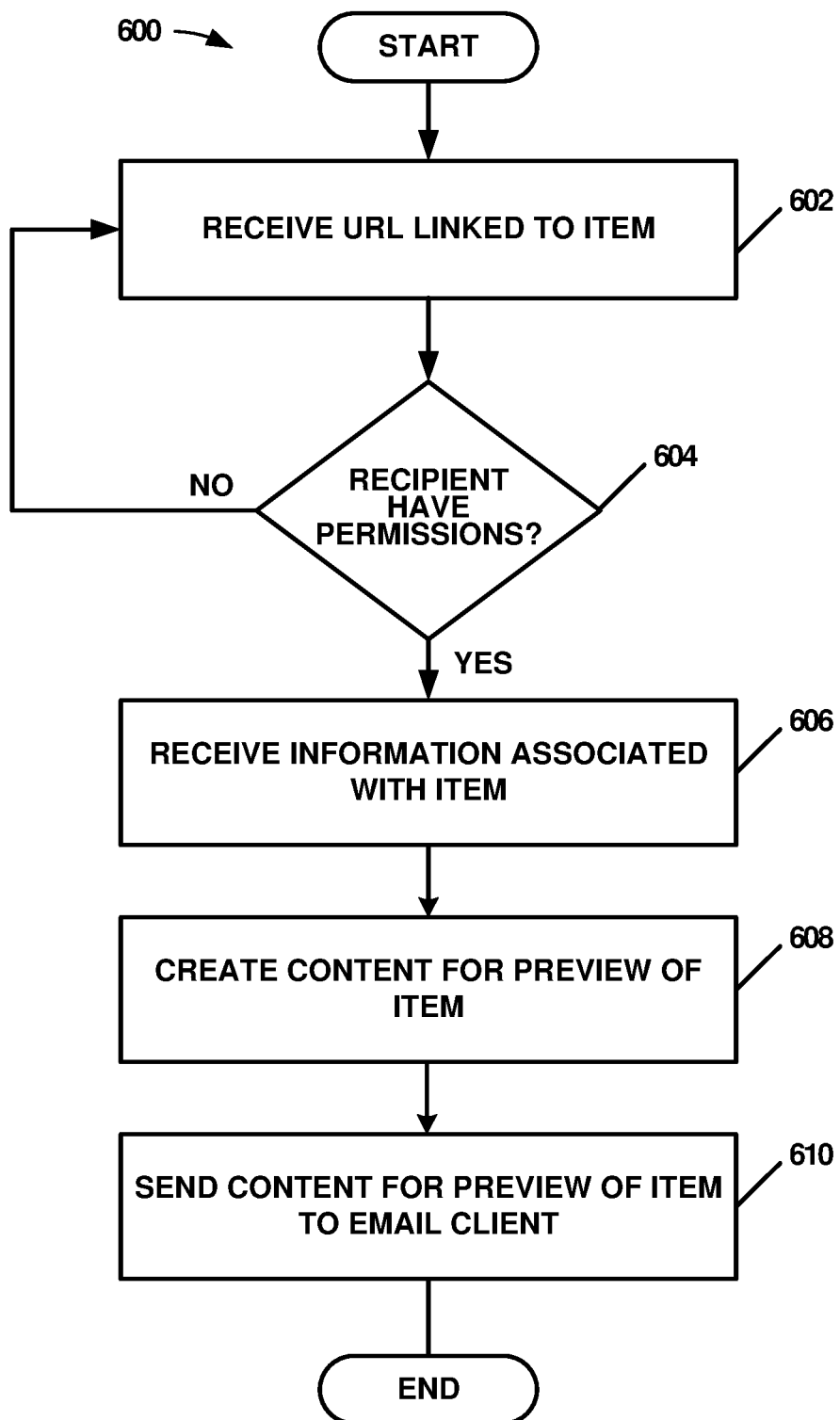
FIG. 6 an exemplary method for providing a preview of a protected item, according to an example aspect.

Referring now to FIG. 6, an exemplary method 600 for providing a preview of a protected item, according to an example aspect is shown. Method 600 may be implemented on a computing device or a similar electronic device capable of executing instructions through at least one processor. Method 600 may begin at operation 602, where a URL linked to at least one item stored in a data service is received at an email server. The URL may indicate the location/source of one or more items. In this regard, the URL may provide a link for accessing the one or more items at the indicated location/source. In one example, the email server may include any email server capable of sending and receiving email messages such as an Exchange Server. The data service may store one or more of the items discussed herein such as files, photos, music, email attachments, documents, web pages, and the like. In one example, the data service may include data services/cloud storage providers such as OneDrive® for Business, Sharepoint®, OneDrive® Consumer, and the like.

At decision operation 604, it is determined whether a recipient of the URL at an email client has permissions to the at least one item stored in the data service. In one example, the permissions may include recipient editing permissions, recipient view permissions, anyone in the sender's organization edit permissions, anyone in the sender's organization view permissions, anyone can edit permissions, and anyone can view permissions. In one example, the email server may send a request to the data service for recipient permissions. The request for recipient permissions may be sent through an application programming interface (API) for the data service. For example, the email server may call and/or execute an API associated with the data service to request recipient permissions from the data service. When it is determined that the recipient of the URL does not have permissions to the at least one item stored in the data service, flow proceeds back to operation 602 where another URL may be received at the email server. As such, when the recipient does not have permissions to the at least one item stored in the data service, the permission protected preview may not be rendered to the recipient in the user interface to the email client. For example, the recipient may not receive the email message at all or may receive the email message without the URL and the permission protected preview of the item identified by the URL.

When it is determined that the recipient of the URL at the email client does have permissions to the at least one item stored in the data service, flow proceeds to operation 606 where information associated with the at least one item stored in the data service is received. In one example, the email server may send a request to the data service for information associated with the one or more items stored at the data service. In one example, the email server may receive information associated with the at least one item stored at the data service and the at least one item itself. The email server may process the information to create content for a preview of the at least one item.

When information associated with the at least one item stored in the data service is received at the email server, flow proceeds to operation 608 where content for a preview of the at least one item is created by processing the information associated with the at least one item stored in the data service. For example, the email server may pull images from a file, implement a screen shot of a file, process metadata associated with the item, and the like to create the content for the preview.

When content for a preview of the at least one item is created by processing the information associated with the at least one item stored in the data service, flow proceeds to operation 610 where the content for the preview of the at least one item is sent to the email client for rendering the preview of the at least one item in a user interface to the email client. In one example, the preview of the at least one item is rendered in a reading pane of the email client. In one example, the URL linked to the at least one item stored in the data service is rendered in the reading pane in the user interface to the email client. In one example, the URL is rendered in the reading pane of the email client proximal the preview of the at least one item.

The term rendering as used herein generally refers to the various capabilities employed in various computing architectures to assemble information that can then be used by other capabilities to generate an image or images. Within the context of methods 500, 600, for example, rendering a preview on a user interface, for example, generally refers to assembling the information or data used to generate an image or images that together result in the file. Animation or other dynamics may also be used to achieve certain effects.

However, it may be appreciated that other perspectives on rendering may be considered within the scope of the present disclosure. For example, rendering as used herein may also, in some scenarios, be considered to refer to the various capabilities employed by various computing architectures to generate an image or images from information assembled for that purpose. With respect to the methods 500, 600, rendering a preview on a user interface may refer to generating an image or images, from information assembled for that purpose, that together result in the file, which can then be displayed.

It may also be appreciated that rendering in some scenarios may refer to a combination of the aforementioned possibilities. For example, rendering in some scenarios may refer to both assembling the information used to generate an image or images for a message and then generating the image or images of the message and/or preview. In addition, a wide variety of other steps, processes, and stages may occur within the context of presenting a preview, all of which may be considered part of presenting a preview. Thus, yet one other variation on methods 500, 600 includes, but is not limited to, receiving an email message, sending a URL, receiving content and presenting a preview on a first user interface.

Figure 7:
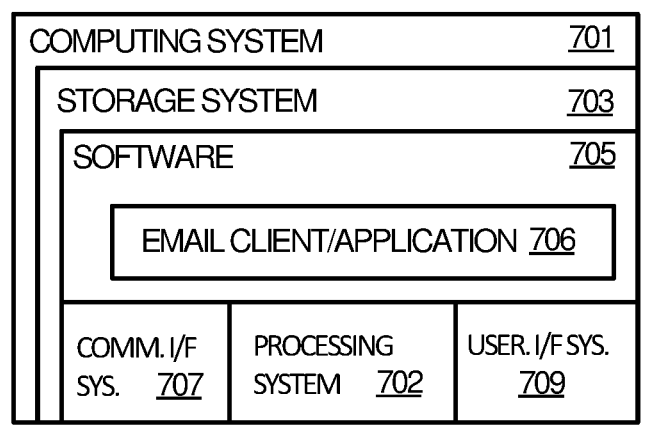
FIG. 7 illustrates a computing system suitable for implementing the enhanced email technology disclosed herein, including any of the environments, architectures, elements, processes, user interfaces, and operational scenarios and sequences illustrated in the Figures and discussed below in the Technical Disclosure.

FIG. 7 illustrates computing system 701 that is representative of any system or collection of systems in which the various applications, services, scenarios, and processes disclosed herein may be implemented. Examples of computing system 701 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709.

Processing system 702 loads and executes software 705 from storage system 703. Software 705 includes application 706, which is representative of the email client discussed with respect to the preceding FIGS. 1-6. When executed by processing system 702 to enhance email systems, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions for implementing enhanced email systems.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or other application software, in addition to or that include compliance tool 706. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system customized to facilitate enhanced email systems. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here.

User interface system 709 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems one or more computer readable storage media; and program instructions stored on the one or more computer readable storage media that, when executed by at least one processor, cause the at least one processor to at least: receive, at an email client, an email message including a uniform resource locator (URL) linked to at least one item stored in a data service; send the URL to an email server to determine whether a recipient of the URL has permissions to the at least one item stored in the data service; when it is determined that the recipient of the URL has permissions to the at least one item stored in the data service, receive content for generating a preview of the at least one item; and render the preview of the at least one item in a user interface to the email client. In further examples, the preview of the at least one item is rendered in a reading pane of the email client. In further examples, the at least one item stored in the data service includes at least a file, a photo, and a folder including a plurality of at least one of files and photos. In further examples, when the at least one item is the folder, the preview is a folder preview. In further examples, the folder preview includes a tile for every item inside the folder. In further examples, when the at least one item is the file, the preview includes at least a file title, a file thumbnail, and a file description. In further examples, the program instructions, when executed by the at least one processor, further cause the at least one processor to render the URL linked to the at least one item stored in the data service in the user interface to the email client. In further examples, in response to receiving an indication of interest with respect to the URL, the program instructions, when executed by the at least one processor, further cause the at least one processor to generate a side by side view including the reading pane and an interactive item view. In further examples, the program instructions, when executed by the at least one processor, further cause the at least one processor to render the side by side view in the user interface to the email client.

Further aspects disclosed herein provide an exemplary computer-implemented method for rendering a permission protected preview of at least one item, the method comprising: receiving, at an email client, an email message including a uniform resource locator (URL) linked to at least one item stored in a data service; sending the URL to an email server to determine whether a recipient of the URL has permissions to the at least one item stored in the data service; when it is determined that the recipient of the URL has permissions to the at least one item stored in the data service, receiving content for the permission protected preview of the at least one item; and rendering the permission protected preview of the at least one item in a user interface to the email client. In further examples, the email client includes a reading pane, and wherein rendering the permission protected view comprises rendering the permission protected preview of the at least one item in the reading pane of the email client. In further examples, the at least one item stored in the data service includes at least a file, a photo, and a folder including a plurality of at least one of files and photos. In further examples, the computer-implemented method further comprises in response to receiving an indication of interest with respect to the URL, generating a side by side view including the reading pane and an interactive item view. In further examples, the computer-implemented method further comprises rendering the side by side view in the user interface to the email client. In further examples, the URL comprises a link to one or more data services.

Additional aspects disclosed herein provide an exemplary computer-implemented method for providing a preview of a protected item, the method comprising: receiving, at an email server, a uniform resource locator (URL) linked to at least one item stored in a data service; determining whether a recipient of the URL at an email client has permissions to the at least one item stored in the data service; when it is determined that the recipient of the URL has permissions to the at least one item stored in the data service, receiving information associated with the at least one item stored in the data service; creating content for a preview of the at least one item by processing the information associated with the at least one item stored in the data service; and sending the content for the preview of the at least one item to the email client for rendering the preview of the at least one item in a user interface to the email client. In further examples, the computer-implemented method further comprises determining whether the URL is a link to one or more data services. In further examples, determining whether a recipient of the URL at an email client has permissions to the at least one item stored in the data service comprises sending a request to the data service for recipient permissions. In further examples, the at least one item stored in the data service includes at least a file, a photo, and a folder including a plurality of at least one of files and photos. In further examples, when the at least one item is the folder, the preview is a folder preview.

Techniques for providing a preview of protected content in a user interface to an email client are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of email systems that execute in conjunction with an email client application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
   one or more computer readable storage media; and
   program instructions stored on the one or more computer readable storage media that, when executed by at least one processor, cause the at least one processor to at least:
   receive, by an email client, an email message including a uniform resource locator (URL) linked to at least one item stored in a remote cloud-based data service that is accessible via a network;
   process, by the email client, the received email message to automatically identify the URL included in the email client;
   responsive to identifying the URL, send, by the email client, the URL to an email server to determine that a recipient of the URL has permissions to the at least one item stored in the data service;
   receive content for rendering a protected preview of the at least one item responsive to the email server determining that the recipient of the URL has permissions to the at least one item;
   render, by the email client, the protected preview of the at least one item in a user interface to the email client, wherein the protected preview ef includes at least the URL and is generated based, at least in part, on a type of the at least one item; and
   in response to an activation of the URL, generate a side by side view including a reading pane and an interactive item view, wherein the reading pane includes the protected preview of the at least one item and the interactive item view includes a view of the at least one item and interactive options for interacting with the at least one item.

2. The system of claim 1, wherein the at least one item includes at least a file, a photo, and a folder including a plurality of at least one of files and photos.

3. The system of claim 2, wherein when the at least one item is the folder, and the preview is a folder preview.

4. The system of claim 3, wherein the folder preview includes a tile for every item inside the folder.

5. The system of claim 2, wherein when the at least one item is the file, the preview includes at least a file title, a file thumbnail, and a file description.

6. The system of claim 1, wherein the program instructions, when executed by the at least one processor, further cause the at least one processor to render the URL linked to the at least one item in the user interface to the email client.

7. The system of claim 1, wherein the program instructions, when executed by the at least one processor, further cause the at least one processor to render the side by side view in the user interface to the email client.

8. A computer-implemented method for rendering a permission protected preview of at least one item, the method comprising:
   receiving, by an email client, an email message including a uniform resource locator (URL) linked to at least one item stored in a remote cloud-based data service that is accessible via a network;
   processing, by the email client, the received email message to automatically identify the URL included in the email client;
   sending, by the email client, the URL to an email server to determine that a recipient of the URL has permissions to the at least one item stored in the data service;

receiving content for rendering the permission protected preview of the at least one item responsive to the email server determining that the recipient of the URL has permissions to the at least one item;

rendering, by the email client, the permission protected preview of the at least one item in a user interface to the email client, wherein the permission protected preview includes at least the URL and is generated based, at least in part, on a type of the at least one item; and in response to an activation of the URL, generating a side by side view including a reading pane and an interactive item view, wherein the reading pane includes the permission protected preview of the at least one item and the interactive item view includes a view of the at least one item and interactive options for interacting with the at least one item.

9. The computer-implemented method of claim 8, wherein the at least one item includes at least a file, a photo, and a folder including a plurality of at least one of files and photos.

10. The computer-implemented method of claim 8, further comprising rendering the side by side view in the user interface to the email client.

11. The computer-implemented method of claim 8, wherein the URL comprises a link to one or more data services.

12. A computer-implemented method for providing a preview of a protected item, the method comprising:

receiving, by an email server, a uniform resource locator (URL) linked to a folder including at least one item stored in a remote cloud-based data service that is accessible via a network;

determining that a recipient of the URL at an email client has permissions to the folder;

receiving information associated with the folder responsive to determining that the recipient of the URL has permissions to the folder;

creating content for a folder preview of the folder by processing the information associated with the folder; and sending the content for the folder preview of the folder for delivery to the email client, wherein the content includes information for rendering the folder preview of the folder in a user interface to the email client, wherein the folder preview includes the URL and a tile for every item inside the folder, wherein in response to an activation of the URL, a side by side view including a reading pane and an interactive item view is generated, and wherein the reading pane includes the folder preview and the interactive item view includes a view of one item inside the folder, an item preview scroll utility for scrolling through every item inside the folder, and interactive options for interacting with each item inside the folder.

13. The computer implemented method of claim 12, further comprising determining whether the URL is a link to one or more data services.

14. The computer implemented method of claim 12, wherein determining that the recipient of the URL at the email client has permissions to the folder comprises sending a request to the data service for recipient permissions.

15. The computer-implemented method of claim 12, wherein the folder stored in the data service includes a plurality of at least one of files and photos.

16. The computer-implemented method of claim 9, wherein when the at least one item is the folder, the preview is a folder preview.

17. The computer-implemented method of claim 16, wherein the folder preview includes a tile for every item inside the folder.

18. The computer-implemented method of claim 9, wherein when the at least one item is the file, the preview includes at least a file title, a file thumbnail, and a file description.

19. The system of claim 1, wherein the program instructions, when executed by the at least one processor, further cause the at least one processor to determine whether the URL is a link to one or more data services.

20. The system of claim 2, wherein when the at least one item is the folder, the interactive item view further includes an item preview scroll utility for scrolling through every item inside the folder.

* * * * *